United States Patent [19]

Looney

[11] 3,808,658
[45] May 7, 1974

[54] SNAP ROLLER

[75] Inventor: John H. Looney, Fairport, N.Y.

[73] Assignee: Xerox Corporation, Stamford, Conn.

[22] Filed: Apr. 20, 1973

[21] Appl. No.: 353,030

[52] U.S. Cl. .................................. 29/110, 29/1
[51] Int. Cl. ........................................ B21b 31/08
[58] Field of Search ............ 29/110, 125, 129, 132; 403/106, 107, 289, 359, 375

[56] References Cited
UNITED STATES PATENTS

| 1,172,374 | 2/1916 | Leimer | 403/289 X |
| 1,339,333 | 5/1920 | Hein | 403/107 X |
| 3,063,711 | 11/1962 | Springer | 29/129 X |
| 3,486,543 | 12/1969 | Nashimura | 29/125 X |
| 3,604,737 | 9/1971 | Tarpey | 403/289 X |

Primary Examiner—Alfred R. Guest

[57] ABSTRACT

A conveyor roller and support assembly for conveying and guiding a belt or the like along a predetermined path of travel. Means are provided by which a roller can be conveniently relocated or removed from the system which includes a pluralty of fingers extending from the body of the roller terminating in an inwardly turn lip capable of being seated within any one of a number of complementary grooves formed in the roller support member.

15 Claims, 2 Drawing Figures

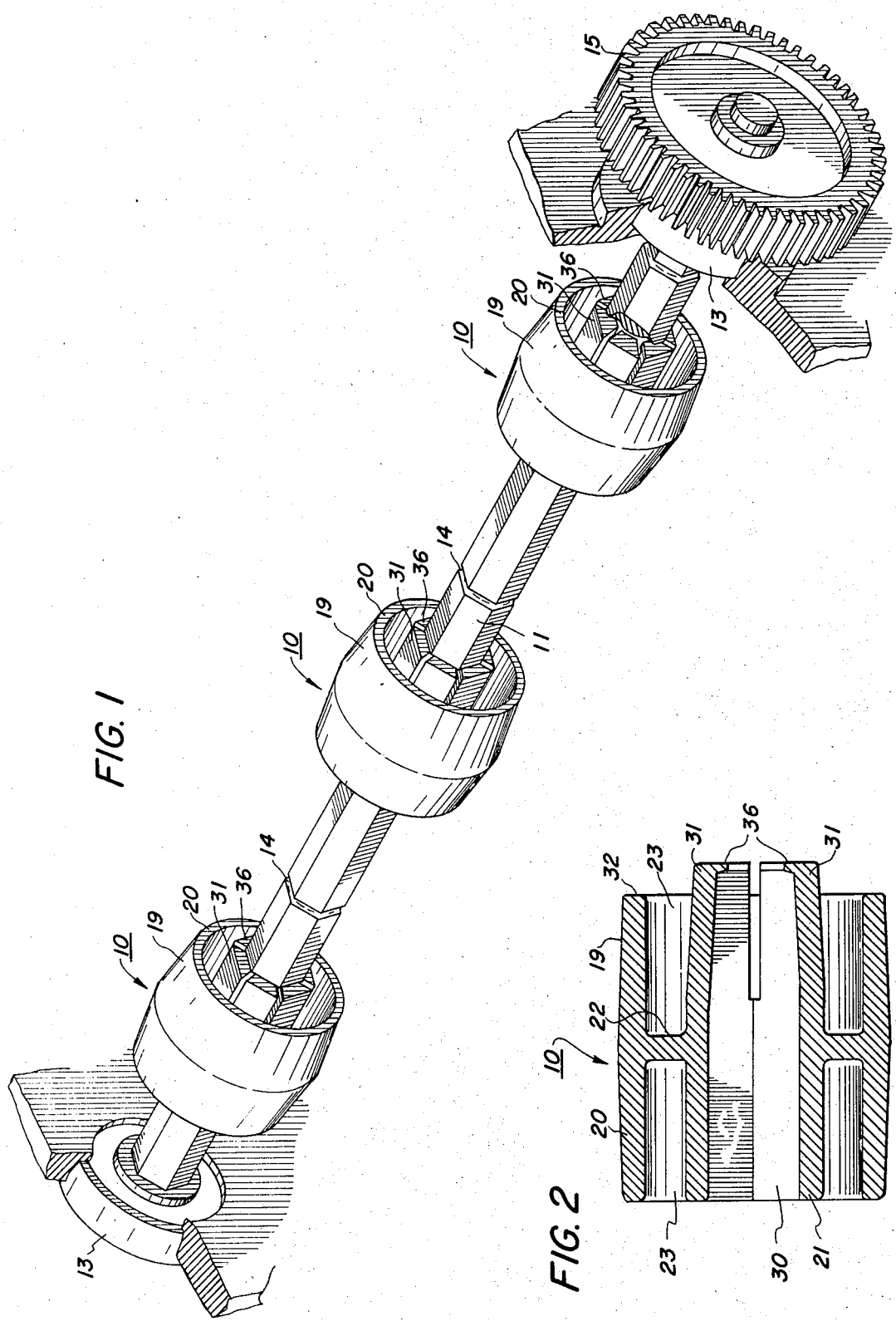

SNAP ROLLER

This invention relates to apparatus for conveying an article along a predetermined path of travel.

More specifically this invention relates to a conveyor system for transporting a belt or the like with particular reference to a conveyor roller that is not only light weight but which can be easily repositioned or replaced in the conveyor system. Most prior art devices of this nature have heretofore been relatively massive devices which lack any adjusting or repositioning features. As a consequence, a relatively extensive downtime is required when a conveyor roller is to be replaced or relocated in such a system.

It is therefore an object of the present invention to improve conveyor systems for transporting and guiding an article along a predetermined path of travel.

It is a further object of the present invention to provide a conveyor system employing conveyor rollers wherein the positioning of the rollers can be conveniently and rapidly changed to accommodate articles of a varying width.

Yet another object of the present invention is to provide a conveyor roller which is light weight and inexpensive to construct or which can be accurately and securely mounted within a conveying system.

A still further object of the present invention is to reduce the amount of time required to change or relocate a conveyor roller within a conveying system.

These and other objects of the present invention are attained by means of a roller having a construction wherein a cylindrical conveyor roller, preferably having a crowned outer periphery, is provided with an axially aligned bore having at least one planar surface capable of mating with a complementary surface upon a support member passed therethrough, a series of inwardly biased fingers attached to the body of the roller with the free end of said fingers being arranged to contact the support member in holding contact, and a lip supported upon the free end of the fingers which is adapted to seat itself within a pre-positioning groove formed within the support member for locating the rollers upon the support member and prevent it from moving in a lateral direction.

For a better understanding of the invention as well as other objects and further features thereof, reference is had to the following detailed description of the invention to be read in connection with the accompanying drawings wherein:

FIG. 1 is an isometric view showing a plurality of the conveyor rollers of the present invention mounted upon a support member;

FIG. 2 is a sectional view taken along the axial center line of one of the rollers illustrated in FIG. 1 showing the construction of said roller.

Referring now to the drawings, there is illustrated in FIG. 1 a conveyor pulley arrangement over which a belt or an article in transit can either be drawn or tracked as the article is being moved over a predetermined path of travel. In this particular embodiment, a plurality of conveyor rollers 10 are mounted upon a support shaft 11 which is journaled for rotation at each end by means of a roller bearing 13. Although the apparatus of the present invention can be used as a freely rotating idler mechanism in a conveyor system, it is herein contemplated that it is within the scope of the present invention to positively drive the roller and support shaft assembly so as to impart motion to the article in transit. To this latter end, one end of the shaft 11 is extended through the right hand bearing 13, as shown in FIG. 1, and has affixed to the extended end thereof a gear member 15 capable of meshing with a suitable source of power for rotating the roller assembly at a predetermined rate.

Each of the rollers 10 can be positioned on the support member 11 at any one of a predetermined point intermediate the support member extremities. As will be explained in further detail below, each roll is slidably mounted upon the support member and is provided with a locking mechanism which is seated within a series of grooves 14 formed within the support member. The rollers can be conveniently repositioned or removed from the support member by releasing the locking member and sliding the roller axially over the support.

Referring now more specifically to FIG. 2, each roller 10 is constructed of a single piece of material, preferably being cast or molded in a manner well known and used in the art from a durable and resilient material such as acrylic based resins or the like. The outer periphery 19 of the roller is crowned having a high point at the longitudinal center of its cylindrical body with the diameter of the roll tapering off uniformly from the center towards the end faces thereof. Toward this end, a taper of about 1½° with the axial center line of the member is provided. The crowned outer periphery of the rollers provides the apparatus with a self-tracking feature in a manner widely known and used in the art.

The outer body 20 of the roller is connected to a hub 21 via a center rib 22 whereby two apertures or voids 23 are formed in the body of the cylindrical roller which considerably reduces the weight of the part without severely sacrificing strength. An axially aligned opening 30 is either cast or machined through the center of the roller to facilitate mounting of the roller upon the support member. As shown in the drawings, the side walls of the opening 30 taper inwardly from a point located at the approximate longitudinal center line of the roller towards the right hand end thereof as viewed in FIG. 2. A plurality of finger-like elements 31 are formed about the tapered portion of the hub. The root of each finger is formed as an integral part of the hub member 21 while the free end of the finger extends outwardly beyond the right end face 32 of the roller body structure. The thickness of each finger is substantially equal to that of the hub member with each of the fingers being tapered inwardly at approximately a 3° angle with the axial center line of the cylinder.

The opening 30 formed in the hub of the roller is of a shape and size to complement the support member with a close sliding fit being had between the two mating parts. Sufficient taper, however, is given to the finger elements so that when the roller is assembled upon the support shaft, the body of each finger is forced back by the support member whereby each finger is capable of engaging the support member in relatively tight holding contact.

On the free end of each finger is formed an inwardly turned lip 36 that is arranged to complement the locating grooves 14 machined or otherwise formed in the support member. In assembly, the lips on the free end of the fingers are adapted to seat within the grooves formed upon the support member to locate the roller at a predetermined position upon the support member and to prevent the roller from shifting in a lateral direction. Because the free end of the fingers extend well beyond the main body of the roller, easy access is afforded to the fingers whereby the fingers and associated lips can be raised or removed from seating engagement within the grooves. In order to reposition or remove the roller in the assembly, the fingers are simply raised to remove the lips from the grooves and the roller body is moved longitudinally over the body of the support member to a new location or alternatively over the end of the support member thereby freeing the roll from the assembly. As noted above, a series of grooves are formed in along the body of the support member which serve as locating points for relocating the rollers at different positions, depending on the size of the article in transit, whereby articles of varying widths can be conveniently accommodated.

Although the use of a circular support shaft is contemplated within the scope of the present invention, it may be desirable and necessary in certain environments to employ a more positive roll mounting arrangement. As seen in FIG. 1, the support shaft of the preferred embodiment of the present invention is hexagon in shape. The internal opening 30 formed within the roller member is also hexagon in shape whereby a plurality of planar surfaces on the shaft are brought into close sliding contact with the complementary internal side walls of the hub. In this particular arrangement, six equally spaced fingers are supported upon the roller and are arranged so that each finger, and its associated lip, is brought into contact with one of the flat planar surfaces on the support shaft. The fingers are spaced about the hub of the roller so that they substantially encompass the outer periphery of the support shaft providing a maximum amount of contact area therebetween thus ensuring that a uniform and secure holding pressure is maintained between the roller and the rotating support member.

While this invention has been described with reference to the structure disclosed herein, it is not necessarily confined to the details as set forth and this application is intended to cover such modifications or changes as may come within the scope of the following claims.

What is claimed is:

1. A roller for transporting an article along a predetermined path of travel including
a generally cylindrical member having an axially aligned opening therethrough adapted to complement a support member in close sliding relation therewith,
a series of inwardly biased fingers connected at the root thereof to the body of the cylindrical member with the free end of said fingers being aligned about the axial center line of said cylinder, said finger being tapered inwardly so as to contact the support member,
an inwardly turned lip positioned upon the free end of each of said fingers for engaging a locating groove in said support member whereby the cylindrical member is locked in a predetermined position upon said support member.

2. The roller of claim 1 wherein the opening formed in said roller has at least one plain surface.

3. The roller of claim 1 wherein the cylinder and the fingers connected thereto are cast as a single part from a resilient plastic material.

4. The roller of claim 3 wherein said material is an acrylic based resin.

5. The roller of claim 1 wherein the fingers substantially encompass the opening formed therein.

6. The roller of claim 1 wherein the free ends of said fingers, and the inwardly turned lips formed thereon, extend beyond one side face of said cylinder.

7. The roller of claim 6 wherein the outer periphery of the cylinder is crowned.

8. The apparatus of claim 7 wherein the outer periphery of the support member includes at least one planar surface whereby said rollers supported thereon are caused to turn with said support member as the support is rotated.

9. The apparatus of claim 8 wherein at least two rollers are mounted upon said support member.

10. The apparatus of claim 7 wherein the rollers and fingers affixed thereto are formed of a single piece of resilient material.

11. The apparatus of claim 7 wherein the fingers associated with each of said rollers substantially encompasses the outer surface of said support member.

12. The apparatus of claim 7 wherein said support member is an elongated hexagon bar having bearing surfaces formed in either end thereof.

13. The apparatus of claim 12 including further means to drive said support member.

14. Apparatus for coveying an article along a predetermined path of travel including
a rotatable support member having a series of predetermined position laterally aligned grooves formed therein,
a plurality of cylindrical rollers, mounted upon said support member, each roller having an axially aligned opening which is complementary to said support member whereby said rollers are slidably supported upon said support member,
a series of inwardly tapered resilient fingers affixed at one end to each of said support rollers with the free end of each finger being axially aligned about said opening whereby the free end of each finger is biased into holding contact against said support member,
an inwardly turned lip formed on the free end of each finger of said rollers and being arranged to seat itself within one of said grooves formed in the support member whereby the roller is located at predetermined position upon said support member and is prevented from shifting in a lateral direction.

15. The apparatus of claim 14 wherein the free end of each finger, and its associated lip, extends beyond one of the side faces of the roller thereby facilitating removal of said lip from seating engagement within said grooves.

* * * * *